United States Patent
Kim

(10) Patent No.: US 11,566,768 B1
(45) Date of Patent: Jan. 31, 2023

(54) LAMP FOR VEHICLE

(71) Applicant: HYUNDAI MOBIS CO., LTD., Seoul (KR)

(72) Inventor: Seok Huyn Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 14 days.

(21) Appl. No.: 17/471,108

(22) Filed: Sep. 9, 2021

(30) Foreign Application Priority Data

Jul. 6, 2021 (KR) .................. 10-2021-0088712

(51) Int. Cl.
*F21S 41/657* (2018.01)
*B60Q 1/26* (2006.01)

(52) U.S. Cl.
CPC .......... *F21S 41/657* (2018.01); *B60Q 1/2657* (2013.01)

(58) Field of Classification Search
CPC .. F21S 41/192; F21S 41/657; F21W 2102/30; B60Q 1/045; B60Q 1/0483; B60Q 1/05; B60Q 1/06; B60Q 1/068; B60Q 1/0683; B60Q 1/0686; B60Q 1/076; B60Q 1/08; B60Q 1/085; B60Q 1/18; B60Q 1/20; B60Q 1/2657
See application file for complete search history.

(56) References Cited

U.S. PATENT DOCUMENTS

| 2015/0217676 | A1* | 8/2015 | Tajima | F16H 19/08 74/89.14 |
| 2017/0089538 | A1* | 3/2017 | Wasilewski | F21S 41/657 |
| 2021/0140601 | A1* | 5/2021 | Baek | F21V 29/70 |

* cited by examiner

*Primary Examiner* — Diane I Lee
*Assistant Examiner* — Steven Y Horikoshi
(74) *Attorney, Agent, or Firm* — DLA Piper LLP (US)

(57) ABSTRACT

A lamp for a vehicle includes a first optical module that forms a first light distribution pattern with light irradiated by a first light source part, a second optical module that forms a second light distribution pattern with light irradiated by a second light source part, a third optical module that forms a third light distribution pattern with light irradiated by a third light source part, a movement part connected to the first light source part and that moves the first light source part, a link part connected to the second light source part and that rotates the second light source part in conjunction with the movement part, and a driving part that provides driving power to the movement part and the link part.

13 Claims, 9 Drawing Sheets

LAMP FOR VEHICLE

CROSS-REFERENCE TO RELATED APPLICATION

This application claims the benefit of priority to Korean Patent Application No. 10-2021-0088712, filed in the Korean Intellectual Property Office on Jul. 6, 2021, the entire contents of which are incorporated herein by reference.

TECHNICAL FIELD

The present disclosure relates to a lamp for a vehicle, and more particularly, to a lamp for a vehicle that may implement various lamp images.

BACKGROUND

In general, a vehicle is equipped with various kinds of lamps having a lighting function for allowing a user to easily identify an object located around a vehicle during nighttime driving and a signal function for informing other vehicles or road users of a driving state of the vehicle.

For example, the vehicle includes headlamps and fog lamps (headlights or front lamps) that mainly perform a lighting function, and turn signal lamps, tail lamps, brake lamps, and side markers that mainly perform a signal function, and installation references and standards of the lamps for vehicles are ruled by laws such that the lamps sufficiently show their functions. In recent years, in addition to a means for lightings of the lamps for vehicles or a means for informing an outside of signals, it has become important to provide differentiated design elements to the lamps. Accordingly, lamps for vehicles, on which light sources are mounted in a matrix form, have been developed.

However, because the conventional lamps for vehicles form static lamp images by using light sources installed in fixed structures, there is a limit in expressing various designs with light-distributed images. Accordingly, it is necessary to improve the technologies such that a visual effect having an improved design may be achieved by implementing various lamp images in addition to static lamp images through simple points of light sources.

SUMMARY

The present disclosure has been made to solve the above-mentioned problems occurring in the prior art while advantages achieved by the prior art are maintained intact.

An aspect of the present disclosure provides a lamp for a vehicle that three-dimensionally and dynamically converts all images of light distribution patterns to implement lamp images of various designs.

Another aspect of the present disclosure provides a lamp for a vehicle that improves a total amount of light, and thus may secure a safety of the vehicle by improving visibility during a bad weather.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a lamp for a vehicle includes a first optical module that forms a first light distribution pattern with light irradiated by a first light source part, a second optical module that forms a second light distribution pattern with light irradiated by a second light source part, a third optical module that forms a third light distribution pattern with light irradiated by a third light source part, a movement part connected to the first light source part and that moves the first light source part, a link part connected to the second light source part and that rotates the second light source part in conjunction with the movement part, and a driving part that provides driving power to the movement part and the link part, and the light irradiated by the third light source part is output to an outside in a state, in which the first light source part is moved and the second light source part is rotated.

Lamp images that are beam patterns formed by the first light distribution pattern, the second light distribution pattern, and the third light distribution pattern may be converted by the movement part and the link part.

The lamp images may include a first mode image formed to include the first light distribution pattern and the second light distribution pattern in an initial state, and a second mode image formed to include the first light distribution pattern, the second light distribution pattern, and the third light distribution pattern in the state, in which the first light source part is moved and the second light source part is rotated.

The driving part may include a driving shaft that moves forwards or rearwards by the driving power, and the movement part may include a movable rod extending along a central axis of the driving shaft, and one lengthwise end of which is coupled to the driving shaft to be moved together with the driving shaft, a main bezel, in which the first light source part is installed, and fixed to an opposite lengthwise end of the movable rod, and a movable plate fixed to the movable rod and spaced apart from the main bezel.

The lamp may further include a base plate, and the base plate may include a body having a through-hole, through which the movable rod passes, a plurality of hinge-coupling parts formed in the body, and provided along a circumference of the through-hole, and a plurality of link through-holes passing through the body, and formed at locations corresponding to the hinge-coupling parts.

The link part may include a plurality of rotary bezels, on which the second light source part is mounted, and hinge-coupled to the hinge-coupling parts so as to be mounted on the base plate to be rotatable, a plurality of first link members connected to the rotary bezel to be rotatable and passing through the link through-holes, a plurality of second link members connected to the first link member to be rotatable, and a link holder, through which the movable rod passes to be rotatable, and coupled to the second link members to be rotatable.

Each of the link through-holes may have an inclined surface that is formed on an inner surface thereof to be inclined at a specific angle so as to restrict a rotation angle of the corresponding first link member.

A pressing member, to which an end of the movable rod is coupled, and that presses the link holder such that the rotary bezels are rotated by the first link members and the second link members when the movable rod is moved may be formed at an end of the driving shaft.

The plurality of rotary bezels may be provided along a circumference of the main bezel, and may be configured such that a rotation angle of the driving part is variable, and the number of the plurality of first link members and the number of the second link members may correspond to the number of the rotary bezels.

The third light source part may be installed on a rear surface of the main bezel, which faces the movable plate, and the third optical module may include a reflection part installed in the movable plate to reflect the light irradiated by the third light source part.

The light reflected by the reflection part may be reflected by the rotary bezels, and the rotary bezels may be coated with a reflective material to reflect the light reflected by the reflection part to an outside.

The lamp may further include a plurality of fourth optical modules that forms a fourth light distribution pattern with light irradiated by a fourth light source part and disposed at a circumference of the first optical module, and a plurality of sub bezels, on which the plurality of fourth optical modules are mounted.

The base plate may further include a plurality of bezel fixing parts disposed between adjacent ones of the hinge-coupling parts, and to which the plurality of sub bezels are fixed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described herein are embodiments that are suitable for understanding the technical features of a lamp for a vehicle according to the present disclosure. However, the present disclosure is not limited to the embodiment described below or the technical features of the present disclosure are not limited by the described embodiments, and the present disclosure may be variously modified without departing from the technical scope of the present disclosure.

Figure 1:
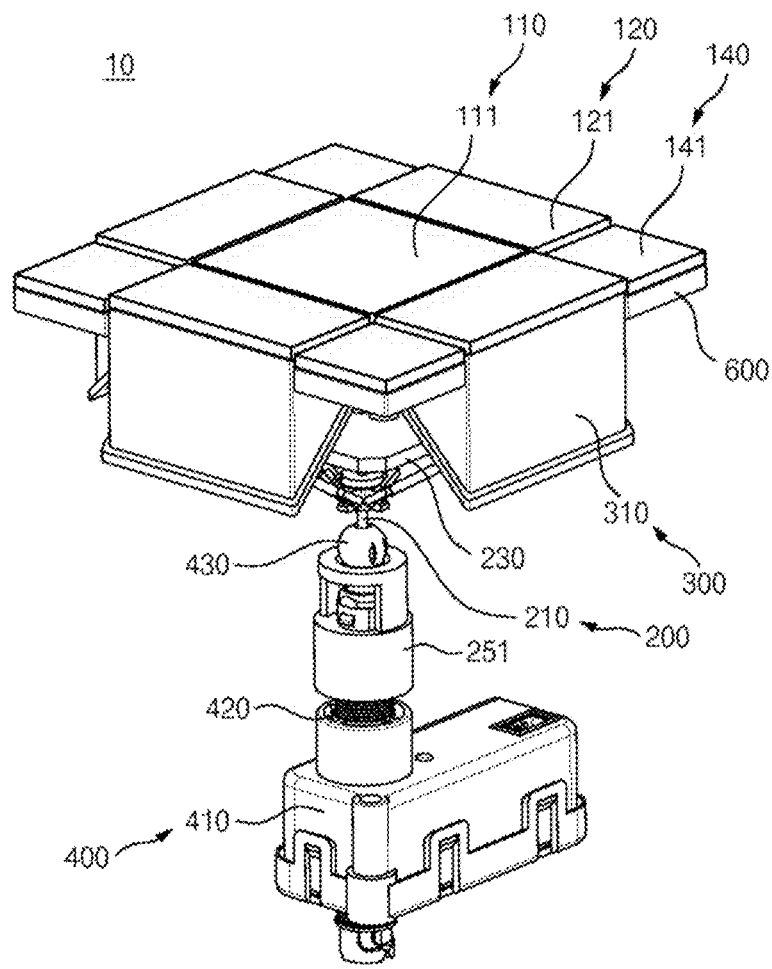
FIG. 1 is a perspective view illustrating a lamp for a vehicle according to an embodiment of the present disclosure.
Figure 2:
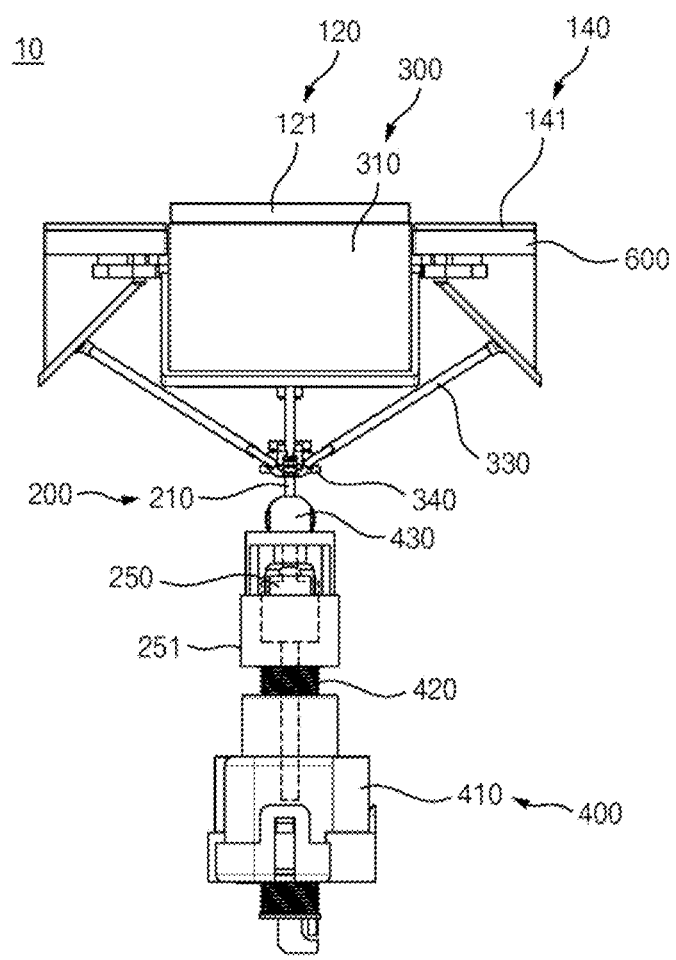
FIG. 2 is a front view illustrating a front side of a lamp for a vehicle according to an embodiment of the present disclosure.
Figure 3:
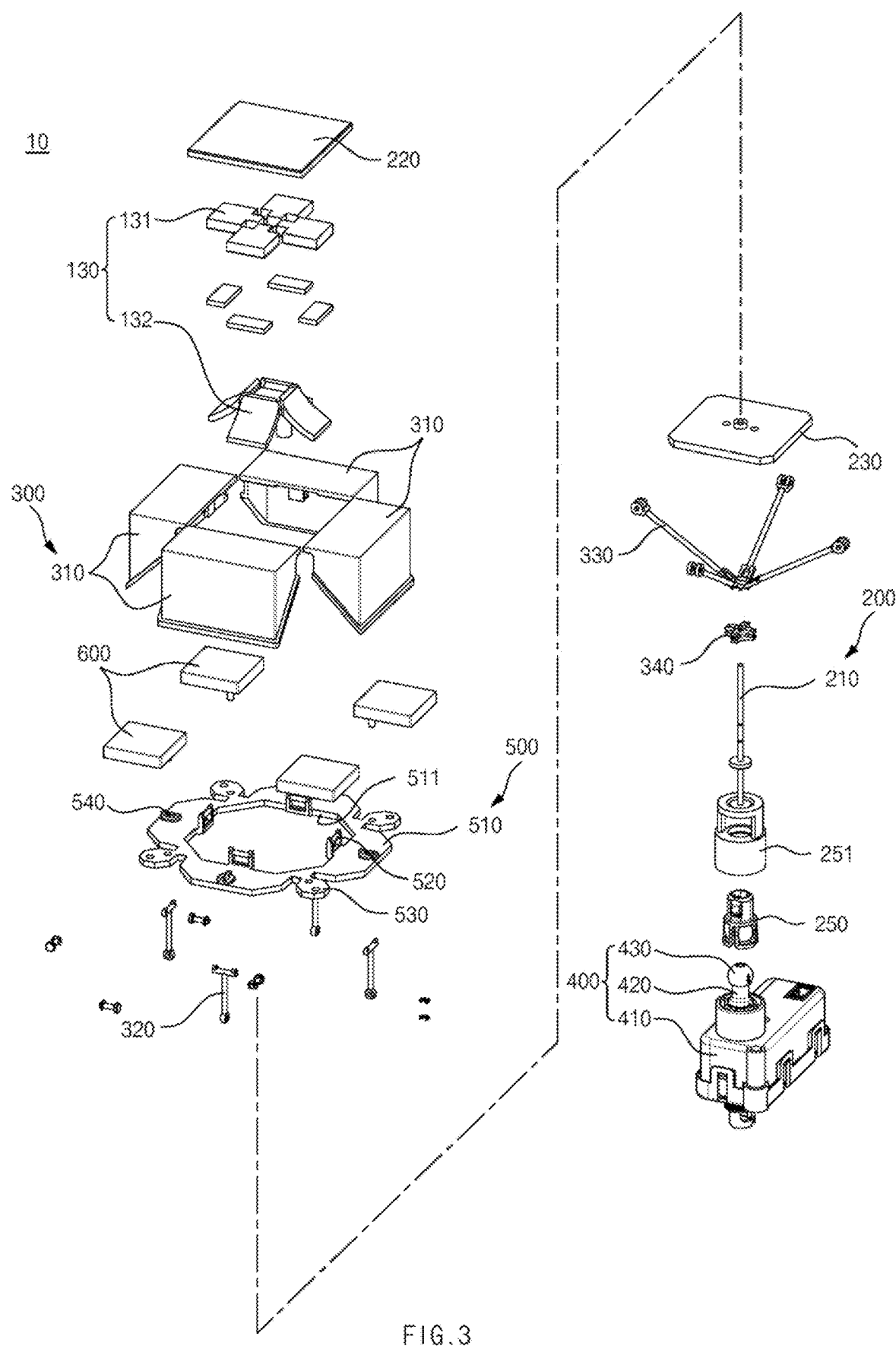
FIG. 3 is an exploded perspective view illustrating the lamp for a vehicle according to the embodiment of the present disclosure, which is illustrated in FIG. 1.
Figure 4:
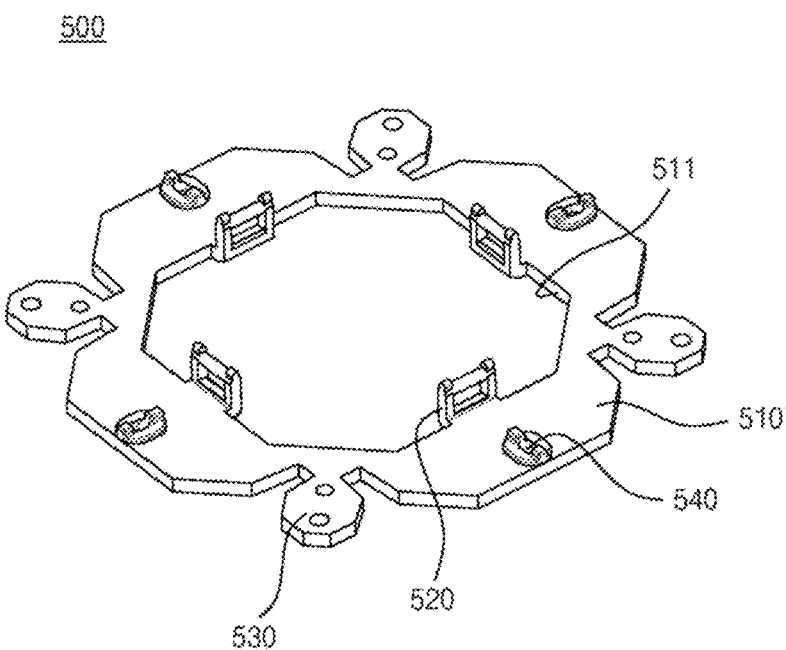
FIG. 4 is a perspective view illustrating a base plate according to an embodiment of the present disclosure.
Figure 5:
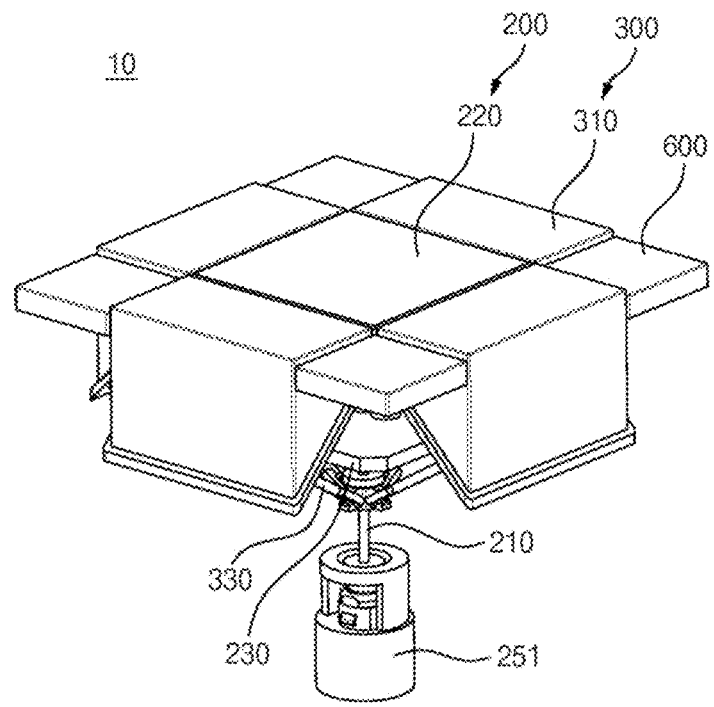
FIG. 5 is a perspective view illustrating a portion FIG. 1.

FIG. 1 is a perspective view illustrating a lamp for a vehicle according to an embodiment of the present disclosure. FIG. 2 is a front view illustrating a front side of a lamp for a vehicle according to an embodiment of the present disclosure. FIG. 3 is an exploded perspective view illustrating the lamp for a vehicle according to the embodiment of the present disclosure, which is illustrated in FIG. 1. FIG. 4 is a perspective view illustrating a base plate according to an embodiment of the present disclosure. FIG. 5 is a perspective view illustrating a portion FIG. 1.

Figure 6:
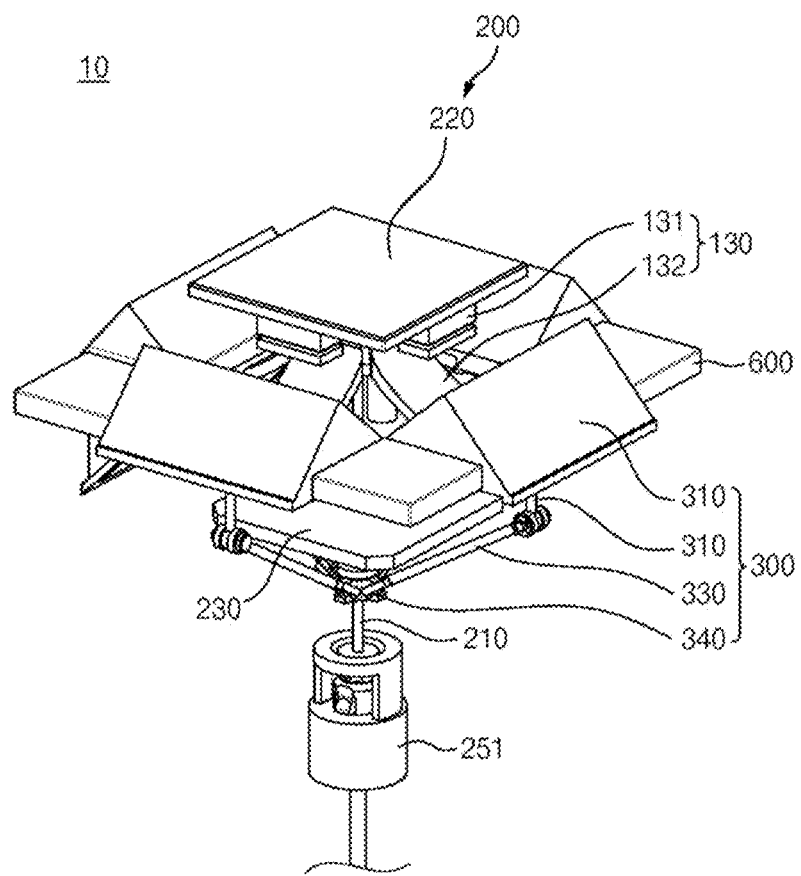
FIG. 6 illustrates an operation of a lamp for a vehicle according to an embodiment of the present disclosure, and illustrates a state of FIG. 5, in which a movement part and a link part are operated.
Figure 7:
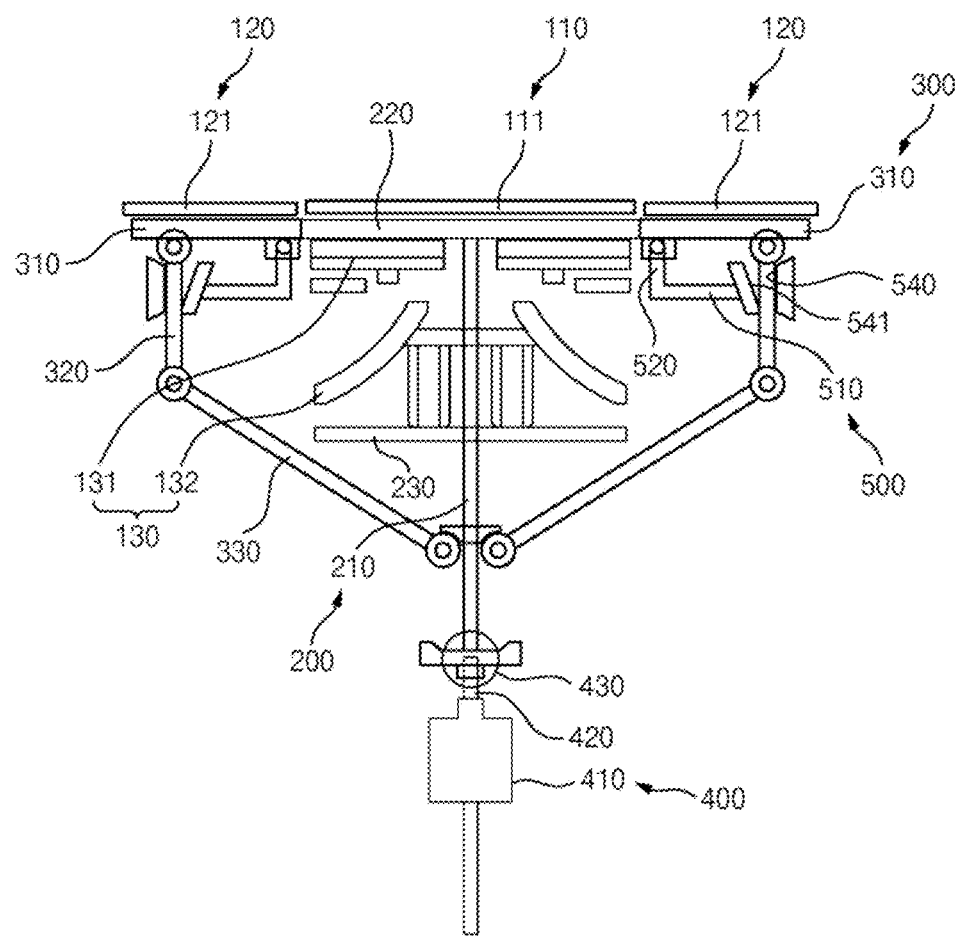
FIG. 7 illustrates a lamp for a vehicle according to an embodiment of the present disclosure, and is a cross-sectional view illustrating a cross-section of FIG. 5.
Figure 8:
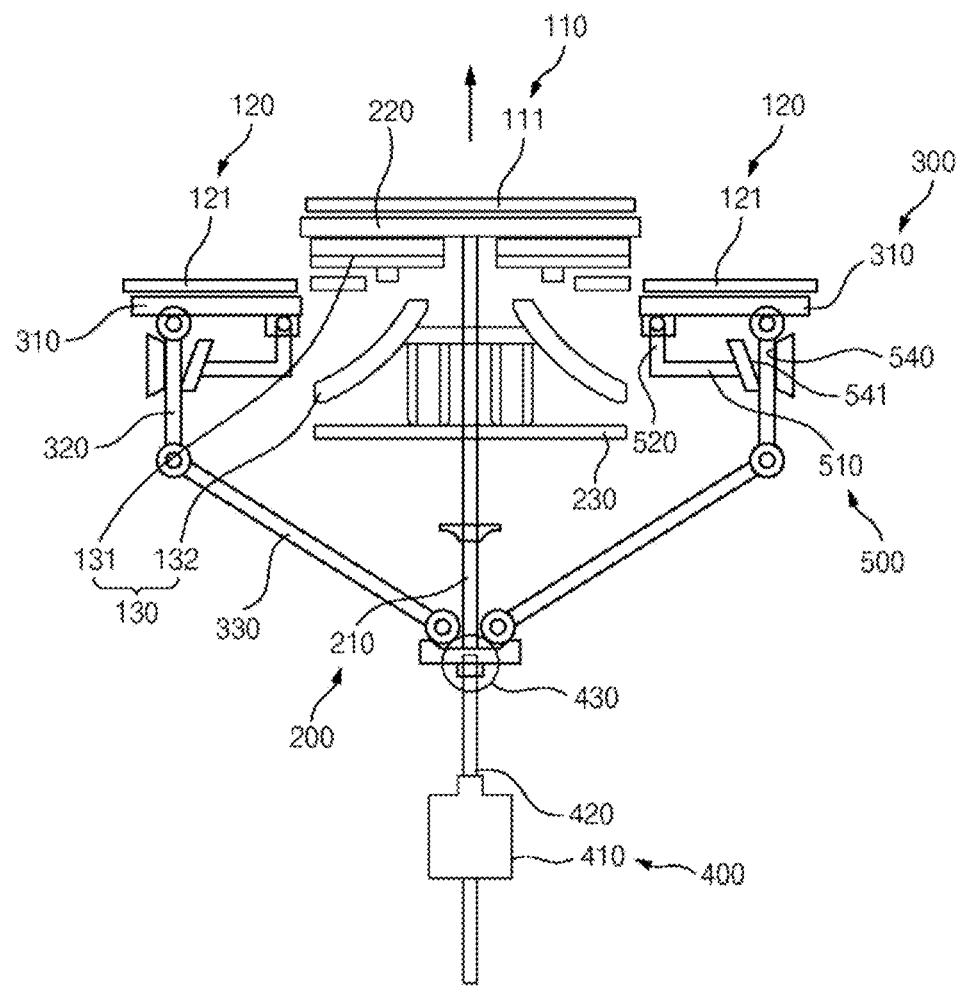
FIG. 8 is a cross-sectional view illustrating a state, in which a movement part is moved in FIG. 7.
Figure 9:
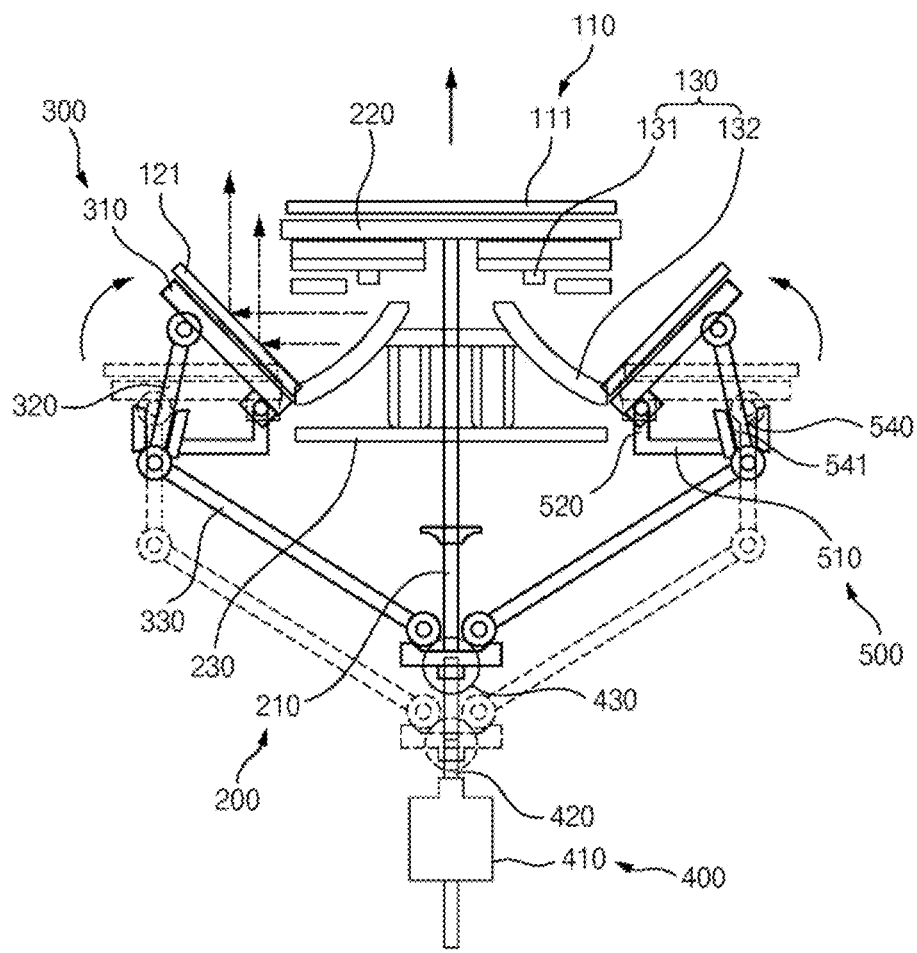
FIG. 9 is a cross-sectional view illustrating a state, in which a link part is rotated in FIG. 8.

FIG. 6 illustrates an operation of a lamp for a vehicle according to an embodiment of the present disclosure, and illustrates a state of FIG. 5, in which a movement part and a link part are operated. FIG. 7 illustrates a lamp for a vehicle according to an embodiment of the present disclosure, and is a cross-sectional view illustrating a cross-section of FIG. 5. FIG. 8 is a cross-sectional view illustrating a state, in which a movement part is moved in FIG. 7. FIG. 9 is a cross-sectional view illustrating a state, in which a link part is rotated in FIG. 8.

Referring to FIGS. 1 to 9, a lamp 10 for a vehicle according to an embodiment of the present disclosure may include a first optical module 110, a second optical module 120, a third optical module 130, a movement part 200, a link part 300, and a driving part 400.

The first optical module 110 is configured to form a first light distribution pattern with light irradiated by a first light source part 111.

In detail, the first optical module 110 may include the first light source part 111, and the first light source part 111 may include a first board, and a plurality of first light sources mounted on the first board. For example, the first light source may be a light emitting diode (hereinafter, referred to as an LED), a micro LED, or the like, and the first board may be a printed circuit board (PCB).

For example, the first board may have a plate shape, and a plurality of first light sources may be arranged in rows and columns on the first board in a matrix form. However, the present disclosure is not limited thereto, but the first light source may be arranged on the first board irregularly. One or two or more first light sources may constitute individual pixels. The first light sources may be turned on or off in unit of pixels under the control of a controller (not illustrated). Accordingly, a first light distribution pattern formed by the first optical module 110 may output various images having different shapes, or may output images having various brightness and colors. That is, the first light distribution pattern formed by the first optical module 110 may be converted into various images.

The second optical module 120 is configured to form a second light distribution pattern with light irradiated by the second light source part 121. One second optical module 120 may be provided or a plurality of second optical modules 120 may be provided around the first optical module 110. The plurality of second optical modules 120 may be integrally operated. Furthermore, the second optical module 120 may be separately operated from the first optical module 110.

In detail, the second optical module 120 may include the second light source part 121, and the second light source part 121 may include a second board and a second light source. The configuration and structure of the second light source part 121 may be the same as those of the above-described first light source part 111. In detail, the second light sources may be arranged on a second board in a matrix form, and the one or the plurality of second light sources may constitute individual pixels. The second light sources may be turned on or off in unit of pixels under the control of a controller (not illustrated), and the brightness and the colors thereof may be adjusted. Accordingly, the second light distribution pattern formed by the second optical module 120 may be converted into various images.

The third optical module 130 is configured to form a third light distribution pattern with light irradiated by a third light source part 131. Here, the light irradiated by the third light source part 131 is output to an outside in a state, in which the first light source part 111 is moved by the movement part 200 and the second light source part 121 is rotated by the link part 300. That is, the third optical module 130 may be configured to irradiate light to the outside through dynamic conversion of the first optical module 110 and the second optical module 120.

Here, the first optical module 110, the second optical module 120, and the third optical module 130 may be turned on or off individually.

The movement part 200 is connected to the first light source part 111, and is configured to move the first light source part 111. In detail, the movement part 200 may be coupled to the first light source part 111, and may linearly move the first light source part 111. Accordingly, the first light distribution pattern may implement a three-dimensional image.

The link part 300 is connected to the second light source part 121, and is configured to rotate the second light source part 121 in conjunction with the movement part 200.

In detail, the link part 300 is a configuration for rotating the second light source part 121, and may be connected to the movement part 200 and be coupled to the second light source part 121. When the movement part 200 moves the first light source part 111, the link part 300 may rotate the second light source part 121 in conjunction with the movement.

The driving part 400 may provide driving power to the movement part 200 and the link part 300.

In detail, the driving part 400 may be connected to the movement part 200 to move the movement part 200 forwards or rearwards. Furthermore, the driving part 400 may operate the link part 300 in conjunction with the movement part 200 when the movement part 200 is moved. Accordingly, the driving part 400 may move the first optical module 110 and rotate the second optical module 120 at the same time.

When the first optical module 110 and the second optical module 120 are dynamically converted by the driving part 400, the light irradiated by the third light source part 131 may be irradiated to the outside. That is, the third light distribution pattern by the third optical module 130 may be included in a lamp image of the lamp for a vehicle according to the present disclosure in a state, in which the first light source part 111 is moved and the second light source part 121 is rotated. Then, as the light by the third light source part 131 is added, the total amount of light irradiated by the lamp 10 for a vehicle may increase.

Lamp images that are all beam patterns formed by the first light distribution pattern, the second light distribution pattern, and the third light distribution pattern may be converted by the movement part 200 and the link part 300. For example, the optical modules may be individually turned on or off as described above, and when the movement part 200 and the link part 300 are not driven, the lamp image may be formed by the first light distribution pattern and the second light distribution pattern. Furthermore, when the movement part 200 and the link part 300 are driven, the entire lamp image may be implemented by the first light distribution pattern and the third light distribution pattern, or may be implemented by the first to third light distribution patterns.

According to the lamp 10 according to the embodiment of the present disclosure, all of the images of the light distribution patterns may be three-dimensionally and dynamically converted by the movement part 200 and the driving part 400, and thus lamp images of various designs may be implemented.

Furthermore, according to the present disclosure, the total amount of light may increase while the light by the second optical module 120 is added through adjustment of the locations of the first optical module 110 and the second optical module 120, and accordingly, visibility may be improved during bad weathers and thus the safety of the vehicle may be secured.

Furthermore, according to the present disclosure, because the movement part 200 and the link part 300 are made to interwork with each other by the one driving part 400, the driving part 400 may be minimized and thus costs may be reduced and the volume and the weight thereof may be decreased.

Meanwhile, the present disclosure may further include a fourth optical module 140. A plurality of fourth optical modules 140 may form a fourth light distribution pattern with light irradiated by a fourth light source part 141, and may be disposed at a circumference of the first optical module 110.

In detail, each of the fourth optical modules 140 may include the fourth light source part 141, and the fourth light source part 141 may include a fourth board, and a plurality of fourth light sources mounted on the fourth board. For example, the fourth light sources may be arranged in rows and columns on the fourth board in a matrix form. One or two or more fourth light sources may constitute individual pixels. The fourth light sources may be turned on or off in unit of pixels, and the brightness and the colors thereof may be adjusted. Accordingly, the fourth light distribution patterns formed by the fourth optical modules 140 may be converted into various images.

For example, the fourth optical modules 140 may be disposed at a circumference of the first optical module 110, and may be disposed between adjacent ones of the second optical modules. Furthermore, the fourth optical modules 140 may be configured to maintain a static state while the locations thereof are not adjusted when the movement part 200 and the link part 300 are driven, but the present disclosure is not limited thereto.

The lamp image corresponding to all of the beam patterns formed by the lamp 10 for a vehicle according to the embodiment of the present disclosure may be largely classified into a first mode image formed before the movement part 200 and the link part 300 are operated, and a second mode image formed while the movement part 200 and the link part 300 are operated.

The first mode image may include a first light distribution pattern and a second light distribution pattern in an initial state. Further, the first mode image may further include a fourth light distribution pattern.

In detail, the first mode image is an image formed in a static state, in which the locations of the first optical module 110 and the second optical module 120 are not changed. As described above, the first light source part 111 and the second light source part 121 may be configured such that the first light sources and the second light sources are disposed on the board in the matrix forms to obtain various images in the static state. The first mode image may be an image by the lamp 10 for a vehicle in a normal condition, and the one lamp 10 for a vehicle may obtain various images.

The second mode image may include the first light distribution pattern, the second light distribution pattern, and the third light distribution pattern in a state, in which the first light source part 111 is moved and the second light source part 121 is rotated. Furthermore, the second mode image may include a fourth light distribution pattern.

In detail, the second mode image is an image formed in a state, in which the locations of the first optical module 110 and the second optical module 120 are changed. The second mode image may be implemented by a three-dimensional image through operations of the first optical module 110 and the second optical module 120, and the amount of light may be increased as the third optical module 130 is added. Accordingly, it may be implemented when various images are necessary or in bad weathers, such as rain or the like.

Meanwhile, hereinafter, detailed configurations of the movement part 200, the link part 300, and the driving part 400 will be described. For reference, FIGS. 1, 2, and 7 to 9 illustrate the first to fourth optical modules, and the first optical module, the second optical module, and the fourth optical module are omitted in FIGS. 3, 5, and 6.

For example, the driving part 400 may be an actuator. The driving part 400 may include a housing 410, a driving motor (not illustrated) provided in an interior of the housing 410, a screw rod that receives driving power of the driving motor to be rotated, and a driving shaft 420 connected to the screw rod to move forwards or rearwards when the screw rod is rotated. Accordingly, the driving shaft 420 may enter or exit the housing 410 due to the driving power of the driving motor to move forwards or rearwards.

The movement part 200 may include a movable rod 210, a main bezel 220, and a movable plate 230.

The movable rod 210 may extend along a central axis of the driving shaft 420, and one lengthwise end thereof may be coupled to the driving shaft 420 to be moved together with the driving shaft 420.

In detail, the movable rod 210 may have a rod shape, and a lower end (with respect to a vertical direction of the drawings) facing the driving part 400 may be fixed to an upper end of the driving shaft 420. When the driving shaft 420 enters and exits the housing 410 to move forwards or rearwards, the movable rod 210 may be moved in conjunction with the movement of the driving shaft 420.

For example, the movement part 200 may further include a retainer 250 and a retainer holder 251. The retainer holder 251 may be provided at a lower end of the movable rod 210 and the retainer 250 may be provided between the retainer holder 251 and the driving shaft 420 to support the driving shaft 420 that moves forwards and rearwards while rotating such that the driving shaft 420 is rotatable.

The first light source part 111 may be installed in the main bezel 220, and the main bezel 220 may be fixed to an opposite lengthwise end of the movable rod 210.

In detail, the main bezel 220 is a member for linearly moving the first light source part 111, and may be fixed to an upper end (with respect to the directions of the drawings) of the movable rod 210. For example, the main bezel 220 may have a plate shape, and may be perpendicular to the movable rod 210. The first light source part 111 may be installed on a surface of the main bezel 220, which faces a front side. As the main bezel 220 is moved, the first optical module 110 may dynamically convert an image.

The movable plate 230 may be fixed to the movable rod 210, and may be spaced apart from the main bezel 220. For example, the movable plate 230 may have a plate shape and may be parallel to the main bezel 220, but the present disclosure is not limited thereto. Components of the third optical module 130 may be mounted on the movable plate 230.

Meanwhile, the lamp 10 for a vehicle according to the present disclosure may further include a base plate 500. The base plate 500 may be mounted to a lamp housing (not illustrated), and may function to support the link part 300.

The base plate 500 may include a main body 510, a hinge-coupling part 520, and a link through-hole 540.

The main body 510 is a part that forms a body of the base plate 500, and has a through-hole 511, through which the movable rod 210 passes. That is, the main body 510 may have a ring shape.

A plurality of hinge-coupling parts 520 are formed in the main body 510, and may be provided along a circumference of the through-hole 511. The link through-holes 540 may pass through the main body 510 and may be formed at locations corresponding to the hinge-coupling parts 520. For example, the hinge-coupling parts 520 may protrude upwards from the main body 510, and the link through-holes 540 may pass through a front surface and a rear surface of the main body 510. The numbers of the hinge-coupling parts 520 and the link through-holes 540 may correspond to the number of the second optical modules 120.

The link part 300 may include a rotary bezel 310, a first link member 320, a second link member 330, and a link holder 340.

The second light source part 121 may be mounted on the rotary bezel 310, and the rotary bezel 310 may be hinge-coupled to the hinge-coupling part 520 to be mounted on the base plate 500 to be rotatable. The locations and the number of the rotary bezels 310 may correspond to those of the second optical modules 120, and the second light source parts 121 may be mounted on surfaces of the rotary bezels 310, which face the front side. A hinge boss connected to the hinge-coupling part 520 to be rotatable may be formed in the rotary bezel 310, and the rotary bezel 310 may be rotated about the hinge-coupling part 520.

The first link member 320 may be connected to the rotary bezel 310 to be rotatable, and may pass through the link through-hole 540. The second link member 330 may be connected to the first link member 320 to be rotatable. The link holder 340 may pass through the movable rod 210 to be movable, and may be coupled to the second link member 330 to be rotatable (see FIG. 7). Here, the numbers of the first link member 320 and the second link member 330 may correspond to the number of the rotary bezels 310.

In detail, the second link member 330 may be connected to the movable rod 210 through the link holder 340. The link holder 340 may be connected to the movable rod 210 such that the movable rod 210 is slid. The link holder 340 may not be moved when the movable rod 210 is moved, but may be moved while being pressed by the driving shaft 420 when the movable rod 210 is moved. While the link holder 340 is moved, the second link member 330 may be rotated (see FIG. 8).

The first link member 320 may be connected to the second link member 330 to be rotatable through a rotary pin or the like, and may be rotated about the rotary pin in conjunction with the second link member 330 when the second link member 330 is rotated. When the first link member 320 is rotated, it may move forwards to a front side of the base plate 500 through the link through-hole 540, and then, the first link member 320 may press the rotary bezel 310. The rotary bezel 310 may be pressed by the first link member 320 and be rotated about the hinge-coupling part 520 (see FIG.

9). Through the process, the movement of the movement part 200 and the rotation of the link part 300 may interwork with each other.

Here, an inclined surface 541 may be formed on a surface of the link through-hole 540, which faces the through-hole 511. The inclined surface 541 may be formed on an inner surface of the link through-hole 511, which faces the through-hole 511, to be inclined at a specific angle so as to restrict a rotation angle of the first link member 320. In detail, referring to FIG. 9, the first link member 320 may contact the inclined surface 541 during rotation thereof, and the first link member 320 may be inclined toward the central axis by an angle corresponding to the angle of the inclined surface 541. In this way, due to the angle of the inclined surface 541 of the link through-hole 540, the rotation angles of the first link member 320 and the rotary bezel 310 may be restricted.

A pressing member 430 may be formed at an end of the driving shaft 420. An end of the movable rod 210 may be coupled to the pressing member 430, and the pressing member 430 may be configured to press the link holder 340 such that the rotary bezel 310 is rotated by the first link member 320 and the second link member 330 when the movable rod 210 is moved.

In detail, the pressing member 430 may be formed to have a diameter that is larger than that of the movable rod 210, and may press the link holder 340 in the movement direction thereof while moving together with the movable rod 210 and contacting the link holder 340.

A plurality of rotary bezels 310 are provided along a circumference of the main bezel 220, and rotation angles of the plurality of rotary bezels 310 may be changed by the driving part 400. As described above, a maximum rotation angle of the rotary bezels 310 may be restricted by the link through-holes 540 of the base plate 500. Furthermore, the rotation angles of the rotary bezels 310 may be adjusted according to a degree of the driving power of the driving part 400, that is, a degree, by which the pressing member 430 presses the link holder 340. Accordingly, an image conversion degree, and an output amount of light by the third light source part 131 may be adjusted.

The third light source part 131 may be installed on a rear surface of the main bezel 220, which faces the movable plate 230. That is, the first light source part 111 may be installed on the front surface of the main bezel 220, and the third light source part 131 may be installed on the rear surface of the main bezel 220.

Furthermore, the third optical module 130 may further include a reflection part 132. The reflection part 132 may be installed in the movable plate 230 to reflect the light irradiated from the third light source part 131. For example, a shape of the reflection part 132 may have a curved shape to be curved in a direction that faces the movable plate 230, but the shape of the reflection part 132 is not limited thereto.

Furthermore, the light reflected by the reflection part 132 may be reflected by the rotary bezels 310. Here, the rotary bezels 310 may be coated with a reflective material to reflect the light reflected by the reflection part 132 to the outside. Here, the reflective material may include aluminum or the like, which may reflect light.

For example, the reflective material may be deposited on rear surfaces of the rotary bezels 310, and the rotary bezels 310 and the second board may be formed of a light transmitting material. Accordingly, the light irradiated by the third light source part 131 may be reflected by the rotary bezels 310 after passing through the third light source part 131. A space may be formed between the rotary bezel 310 and the main bezel 220 as the rotary bezel 310 is rotated and the main bezel 220 is moved, and the light reflected by the rotary bezel 310 may be irradiated to the front side through the space. Furthermore, the reflective material also may be coated on a rear surface of the main bezel 220, which faces the reflection part 132. Accordingly, the light irradiated by the third light source part 131 and the light irradiated to the main bezel 220 through the reflection part 132 may be reflected to the reflection part 132 again.

Meanwhile, the embodiment of the present disclosure may further include sub bezels 600, on which the fourth optical modules 140 are mounted. Furthermore, the base plate 500 may further include bezel fixing parts 530 disposed between adjacent ones of the hinge-coupling parts 520 and to which the sub bezels 600 are fixed.

That is, locations of the bezel fixing parts 530 may correspond to the locations of the sub bezels 600, and may be coupled to the sub bezels 600 through bolting. Accordingly, mechanical conversions, such as rotations or movements, of the sub bezels 600 and the fourth optical modules 140 coupled thereto may not be made. However, as described above, the fourth optical modules 140 may convert an image in a static state.

In this way, according to the lamp for a vehicle according to the embodiment of the present disclosure, all of the images of the light distribution patterns may be three-dimensionally and dynamically converted by the movement part and the driving part, and thus lamp images of various designs may be implemented.

Furthermore, according to the present disclosure, the total amount of light may increase while the light by the third optical module is added through adjustment of the locations of the first optical module and the second optical module, and accordingly, visibility may be improved during bad weathers and thus the safety of the vehicle may be secured.

Furthermore, according to the present disclosure, because the movement part and the link part are made to interwork with each other by the one driving part, the driving part may be minimized and thus costs may be reduced and the volume and the weight thereof may be decreased.

In this way, according to the lamp for a vehicle according to the embodiment of the present disclosure, all of the images of the light distribution patterns may be three-dimensionally and dynamically converted by the movement part 200 and the driving part 400, and thus lamp images of various designs may be implemented.

Furthermore, according to the embodiment of the present disclosure, the entire amount of light may increase while the light by the second optical module is added through adjustment of the locations of the first optical module and the second optical module, and accordingly, visibility may be improved during bad weathers and thus the safety of the vehicle may be secured.

Furthermore, according to the embodiment of the present disclosure, because the movement part and the link part are made to interwork with each other by the one driving part, the driving part may be minimized and thus costs may be reduced and the volume and the weight thereof may be decreased.

Although the specific embodiments of the present disclosure have been described until now, the spirit and scope of the present disclosure are not limited to the specific embodiments, and may be variously corrected and modified by an ordinary person in the art, to which the present disclosure pertains, without changing the essence of the present disclosure claimed in the claims.

What is claimed is:

1. A lamp for a vehicle, comprising:
a first optical module configured to form a first light distribution pattern with light irradiated by a first light source part;
a second optical module configured to form a second light distribution pattern with light irradiated by a second light source part;
a third optical module configured to form a third light distribution pattern with light irradiated by a third light source part;
a movement part connected to the first light source part and configured to move the first light source part;
a link part connected to the second light source part and configured to rotate the second light source part in conjunction with the movement part; and
a driving part configured to provide driving power to the movement part and the link part,
wherein the light irradiated by the third light source part is output to an outside in a state, in which the first light source part is moved and the second light source part is rotated.

2. The lamp of claim 1, wherein lamp images that are beam patterns formed by the first light distribution pattern, the second light distribution pattern, and the third light distribution pattern are converted by the movement part and the link part.

3. The lamp of claim 2, wherein the lamp images include:
a first mode image formed to include the first light distribution pattern and the second light distribution pattern in an initial state; and
a second mode image formed to include the first light distribution pattern, the second light distribution pattern, and the third light distribution pattern in the state, in which the first light source part is moved and the second light source part is rotated.

4. The lamp of claim 1, wherein the driving part includes a driving shaft configured to move forward or rearwards by the driving power, and
wherein the movement part includes:
a movable rod extending along a central axis of the driving shaft, and one lengthwise end of which is coupled to the driving shaft to be moved together with the driving shaft;
a main bezel, in which the first light source part is installed, and fixed to an opposite lengthwise end of the movable rod; and
a movable plate fixed to the movable rod and spaced apart from the main bezel.

5. The lamp of claim 4, further comprising:
a base plate,
wherein the base plate includes:
a body having a through-hole, through which the movable rod passes;
a plurality of hinge-coupling parts formed in the body, and provided along a circumference of the through-hole; and
a plurality of link through-holes passing through the body, and formed at locations corresponding to the hinge-coupling parts.

6. The lamp of claim 5, wherein the link part includes:
a plurality of rotary bezels, on which the second light source part is mounted, and hinge-coupled to the hinge-coupling parts so as to be mounted on the base plate to be rotatable;
a plurality of first link members connected to the rotary bezels to be rotatable and passing through the link through-holes;
a plurality of second link members connected to the first link members to be rotatable; and
a link holder, through which the movable rod passes to be rotatable, and coupled to the second link members to be rotatable.

7. The lamp of claim 6, wherein each of the link through-holes has an inclined surface that is formed on an inner surface thereof to be inclined at a specific angle so as to restrict a rotation angle of a corresponding first link member.

8. The lamp of claim 6, wherein a pressing member, to which an end of the movable rod is coupled, and configured to press the link holder such that the rotary bezels are rotated by the first link members and the second link members when the movable rod is moved at an end of the driving shaft.

9. The lamp of claim 6, wherein the plurality of rotary bezels are provided along a circumference of the main bezel, and are configured such that a rotation angle of the driving part is variable, and
wherein a number of the plurality of first link members and a number of the second link members correspond to a number of the rotary bezels.

10. The lamp of claim 6, wherein the third light source part is installed on a rear surface of the main bezel, which faces the movable plate, and
wherein the third optical module includes:
a reflection part installed in the movable plate to reflect the light irradiated by the third light source part.

11. The lamp of claim 10, wherein the light reflected by the reflection part is reflected by the rotary bezels, and
wherein the rotary bezels are coated with a reflective material to reflect the light reflected by the reflection part to an outside.

12. The lamp of claim 5, further comprising:
a plurality of fourth optical modules configured to form a fourth light distribution pattern with light irradiated by a fourth light source part and disposed at a circumference of the first optical module; and
a plurality of sub bezels, on which the plurality of fourth optical modules are mounted.

13. The lamp of claim 12, wherein the base plate further includes a plurality of bezel fixing parts disposed between adjacent ones of the hinge-coupling parts, and to which the plurality of sub bezels are fixed.

* * * * *